United States Patent [19]

Oishi et al.

[11] Patent Number: 4,618,903

[45] Date of Patent: Oct. 21, 1986

[54] MAGNETIC TAPE CASSETTE

[75] Inventors: Kengo Oishi; Masaaki Suzuki, both of Kanagawa, Japan

[73] Assignee: Fuji Photo Film Co., Ltd., Kanagawa, Japan

[21] Appl. No.: 649,581

[22] Filed: Sep. 12, 1984

[30] Foreign Application Priority Data

Sep. 16, 1983 [JP] Japan .................. 58-142349

[51] Int. Cl.$^4$ ................. G11B 23/02; G11B 23/04
[52] U.S. Cl. ..................................... 360/132; 360/93; 242/198
[58] Field of Search ............. 360/132, 96.5, 93, 96.1, 360/137, 133; 242/197, 198, 199, 71.2; 206/387; 358/78 R

[56] References Cited

U.S. PATENT DOCUMENTS

| 1,904,097 | 4/1933 | Steiner | 242/71.2 X |
| 2,867,389 | 1/1959 | Viets | 242/199 X |
| 3,815,971 | 6/1974 | Land | 352/78 R X |
| 4,093,149 | 6/1978 | Shroff et al. | 242/198 |
| 4,399,480 | 8/1983 | Edwards | 360/132 |
| 4,470,083 | 9/1984 | Doering et al. | 360/137 |
| 4,503,474 | 3/1985 | Nigam | 360/133 |

FOREIGN PATENT DOCUMENTS 2058261 8/1971 Fed. Rep. of Germany ...... 242/199

Primary Examiner—Stuart N. Hecker
Assistant Examiner—Benjamin E. Urcia
Attorney, Agent, or Firm—Sughrue, Mion, Zinn, Macpeak & Seas

[57] ABSTRACT

A compact magnetic tape cassette suitable for digital recording in which dust is prevented from entering the cassette and contaminating the tape held therein. Slide grooves are formed in upper and lower walls of the case of the cassette, behind a central opening and side openings on either side of the central opening. Slidable guard panels which slide to close the central opening and the side openings and which are substantially U shaped in section have slides which are engaged with the slide grooves. Each of the guard panels has a through-hole in the front wall thereof which is slidable to open the respective side opening when the guard panels are urged against compression springs arranged on side portions of the front wall of the cassette case. The cassette is symmetrical in configuration.

17 Claims, 6 Drawing Figures

MAGNETIC TAPE CASSETTE

BACKGROUND OF THE INVENTION

The present invention relates to magnetic tape cassettes, and more particularly to a compact magnetic tape cassette which is substantially equal in size to a so-called Philips-type magnetic tape cassette.

Recently, cassette tape recorders have been reduced in both size and weight, and magnetic tape cassettes used in such recorders have been also miniaturized. Further, there has been a strong demand for provision of compact magnetic tape cassettes which are suitable for recording and reproducing signals with a high quality and at a high density and which have long playing times.

Heretofore, in the case of compact magnetic tape cassettes generally employed for audio usage, analog signals are utilized for recording and reproducing. In the analog system, recording and reproducing at a high density are necessarily limited. However, it is well known that employment of a digital system such as a pulse code modulation (PCM) system in which recording and reproducing operations are carried out with input signals converted into pulses makes it possible to perform high density recording and reproducing operations without noise induced in signal communication paths and without being affected by the quality of recording media.

On the other hand, recent research and development has provided a magnetic head which, using a multi-track recording technique, can perform high density recording and reproducing operations even with a magnetic tape used in the Philips-type magnetic tape cassette. As a result, multi-track recording and reproducing operations can be achieved with a compact magnetic tape cassette which is substantially equal in size to the standard Philips-type magnetic tape cassette.

It is assumed for multi-track recording using a stationary head system thirty-six tracks are used in both directions. In this case, the width of each track is of the order of 100 microns, which is much smaller than that for the conventional four-track recording operation with the Philips-type magnetic tape cassette. That is, the effective area of the magnetic head on each track is considerably small. Therefore, if dust is present in the space between the magnetic head and the magnetic tape, its adverse effects on the recording and reproducing characteristics are much greater than in the case of the conventional recording operation.

A typical example of a magnetic tape cassette presently used for high density recording and reproducing operations is a video tape cassette, which is recorded on and reproduced using a rotary head system. In order to protect the magnetic tape in the cassette from damage and to prevent harmful influence of dust on the high density recording and reproducing operation, the cassette is provided with a swingable guard panel on the front opening. In the case of the rotary head system, the magnetic tape is run only in one direction for recording and reproducing (except when a special type of tape cassette is used), and therefore the cassette case need not be of a symmetrical structure to permit the use of both sides (A and B) of the cassette. Furthermore, in the rotary head system, typically, two magnetic heads forming a predetermined angle with the tape running direction are alternately brought into sliding contact with the magnetic tape, thus removing dust from the magnetic tape. Accordingly, the adverse effects of dust on the recording and reproducing characteristics in the rotary head system are less than for a stationary head system.

A magnetic tape cassette to which the technical concept of the invention is to be applied employs a stationary head system, similar to the case of the Philips-type magnetic tape cassette, and has a number of recording tracks. Furthermore, in this magnetic tape cassette, both the upper and lower halves of the magnetic tape are used for recording and reproducing operations. Since the cassette is a one which has both A and B sides, and since the cassette is operated according to the stationary head system, as explained above, the recording and reproducing characteristics are more sensitive to the adverse effects of dust than a cassette operated with the rotary head system. Accordingly, the cassette should have a guard panel which provides a greater protection against dust than the guard panel of a video tape cassette.

SUMMARY OF THE INVENTION

In view of the foregoing, an object of the invention is to provide a magnetic tape cassette which has guard panels providing positive dustproofing, has two sides of symmetrical configuration, and can be used for multi-track recording and reproducing operations.

The foregoing and other objects of the invention have been achieved by the provision of a magnetic tape cassette which has a central hole for receiving a magnetic head in the front wall of a cassette case receiving a pair of hubs on which a magnetic tape is wound, and two side holes for receiving pinch rollers and capstans in the front wall in such a manner that the side holes are located on both sides of the central hole. According to the invention, slide grooves are formed in the upper and lower walls of the cassette case behind the central opening and side openings and extending in the longitudinal direction of the cassette case. A pair of slidable guard panels, which are adapted to close the central opening and side openings and which are substantially U-shaped in section, have slides engaged with the slide grooves and have through-holes in correspondence to the side openings. Compression springs arranged on both side portions of the front wall of the cassette case urge the guard panels to close the openings. The two sides of the cassette are symmetrical in configuration.

DESCRIPTION OF THE PREFERRED EMBODIMENTS

The present invention will be described with reference to preferred embodiments shown in the accompanying drawings.

Figure 1:
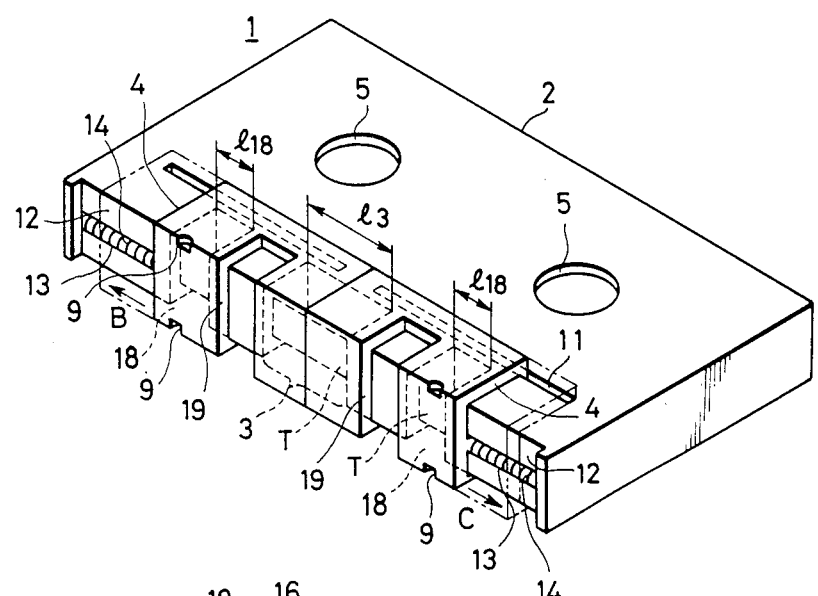
FIG. 1 is a perspective view showing a first example of a magnetic tape cassette according to the invention.

FIG. 1 is a perspective view showing a first example of a magnetic tape cassette according to the invention.

As shown in FIG. 1, the magnetic tape cassette 1 is a compact cassette which is substantially the same in size as a conventional Philips-type cassette. In this magnetic tape cassette, the central portion of the front surface of the cassette case body 2 is recessed to form a rectangular central opening 3. Furthermore, two side openings 18 each having a width $l_{18}$, which is substantially half of the width $l_3$ of the central opening 3, are formed on both sides of the central opening 3. The central opening 3 is adapted to receive the recording and reproducing (playback) head and the erasing head of a recording and reproducing device. Each of the side openings 18 is adapted to receive a pinch roller and a capstan.

Figure 2:
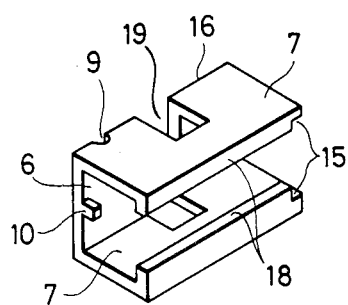
FIG. 2 is a perspective view showing the inside of a guard panel in FIG. 1.

The front portion of the cassette case body 2 is covered by a pair of guard panels 4 which are slidable in the longitudinal direction of the cassette. Each guard panel 4, as shown in FIG. 2, has a front wall 6 and upper and lower walls 7, and is substantially U-shaped in vertical section. The guard panel 4 has a through-hole 19 formed in the front wall 6 and the upper and lower walls 7, dividing the guard panel 4 into two parts. The upper and lower walls 7 have slides 8 along the rear edges which extend in the longitudinal direction of the guard panel 4 and confront one another. Two slide grooves 11 are formed in each of the upper and lower walls of the cassette case body behind the openings 3 and 18 and extend in the longitudinal direction of the cassette case body. The slides 8 are slidably engaged with the respective slide grooves 11. When the left guard panel 4 (positioned on the left-hand side as viewed from the front of the cassette) is slid to the left in the direction of the arrow B while the right guard panel 4 is slid to the right in the direction of the arrow C, the central opening 3 is opened and the side openings 18 are also opened through the respective through-holes 19.

A magnetic tape T wound on a pair of hubs (not shown) is loaded in the cassette case body 2 runs along the central opening 3 and the side openings 18. The hubs are arranged in the cassette case body in the conventional manner in correspondence with a pair of shaft insertion holes 5 into which the drive shafts of the recording and reproducing device are received. The central opening 3 may be provided with a shield plate (not shown) which is used to prevent the interference of external electromagnetic noise during recording or reproducing, and a leaf spring with a pressure pad (not shown) which causes the magnetic tape T to positively contact the magnetic head.

Two recesses 9 are symmetrically formed in the upper and lower edges 16 of the front wall 6 of each guard panel 4. When the magnetic tape cassette 1 is loaded in the recording and reproducing device, an opening device 20 (FIG. 3) described later engages the recesses 9 to slide the guard panels 4 in the longitudinal direction.

A spring accommodating groove 13 is formed horizontally in each of the side parts 12 of the front wall of the cassette case body 2 in such a manner that it divides each side part 12 into two parts. A compression spring 14 is provided in each of the spring accommodating grooves 13 thus formed. In each guard panel 4, a protrusion 10 is formed on the inside of the front wall 6. The protrusions 10 are inserted in the spring accommodating grooves 13 and urged by the compression springs 14 so that the right guard panel 4 is urged to the left and the left guard panel 4 to the right at all times.

The right guard panel 4 is controlled in position so that when the innermost ends of the slides 18, which are closer to the center of the cassette front wall, abut against the left ends of the right slide grooves 11, the right guard panel 4 closes the central opening 3 and the right opening 18. The left guard panel 4 is also position controlled in the same manner. Cuts 15 are formed in the innermost ends of the slides 8 so that the guard panels 4 are positively engaged with each other.

With the slide grooves 11 and the slides 8 formed as described above, even if the right and left compression springs 14 produce different compression forces, the guard panels 4 can positively close the central opening 3 and the side openings 18. In order to positively hold the compression springs in the spring accommodating grooves 13, the grooves 13 have a section which diverges toward the rear of the cassette.

The material of the cassette case body 2 may be a plastic resin such as polyacetal or ABS resin as in the conventional cassette case body. The guard panel 4 may be made of a plastic resin, such as polyacetal, or metal. However, the material should be properly elastic so that the guard panel can be readily coupled to the cassette case body 2.

The magnetic tape T may be a ferromagnetic iron oxide tape or a chromium dioxide tape, although it is preferable that it be a metal tape or a vacuum deposited tape with which signals can be recorded and reproduced with a higher density.

When the magnetic tape cassette 1 thus constructed is loaded in the recording and reproducing device, the guard panels 4 are opened by the aforementioned opening device 20 provided at the cassette inserting section. The operation of the guard panels 4 by the opening device 20 will be described with reference to FIGS. 3 and 4.

Figure 3:
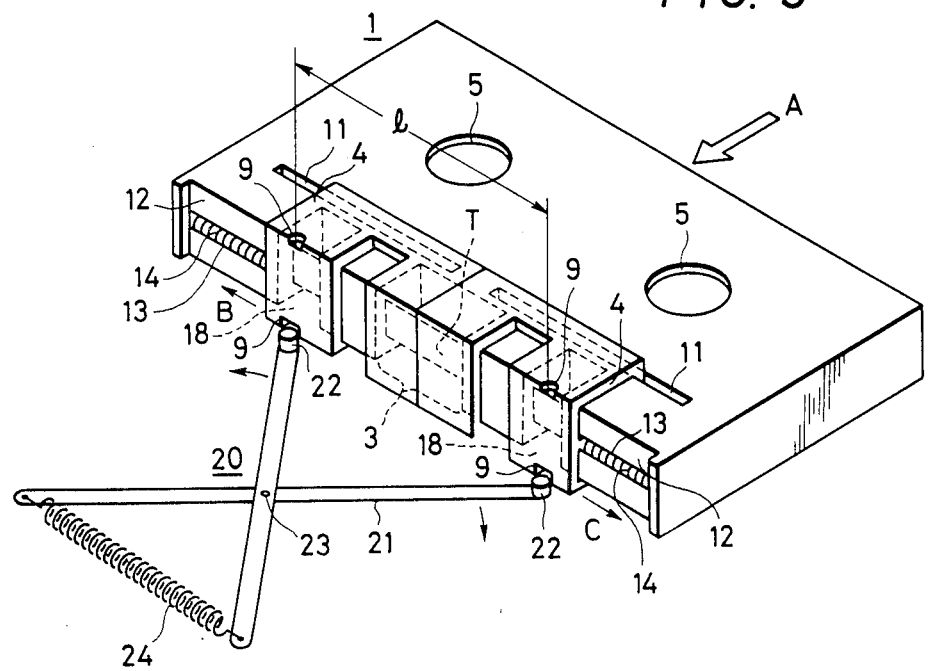
FIG. 3 is a perspective view showing the operation of the guard panels.

The opening device 20, as shown in FIG. 3 includes a pair of plate-shaped arms 21, having engaging parts 22 at first ends which are adapted to engage the recesses 9 of the guard panels 4, and a tension spring 24. The arms 21 cross each other substantially at the center 23; that is, the arms 21 are substantially in the form of an "X", rotatable around the cross center 23. The tension spring 24 is connected to the second ends of the arms 21 so as to pull the second ends towards each other. The opening device 20 thus constructed is provided on the upper or lower side of the cassette inserting section. More specifically, the opening device 20 is arranged so that the engaging parts 22 are directed towards the cassette inserting opening and the distance l between the recesses 9 of the two guard panels 4 is equal to the distance between the engaging parts 22.

Accordingly, while the magnetic tape cassette 1 is being pushed into the cassette inserting opening in the direction of the arrow A, the engaging parts 22 are engaged with the recesses 9. As the magnetic tape cassette 1 is further pushed in this direction, the arms 21 are opened to increase the distance between the engaging parts 22, and accordingly the guard panels 4 are slid to the right and left in the directions of the arrows B and C, respectively. As described above, the recesses 9 are formed symmetrically at the upper and lower edges of the front wall of each guard panel. Therefore, whichever of the two sides A or B of the magnetic cassette tape 1 is selected during loading, the guard panels 4 can be opened.

Figure 4:
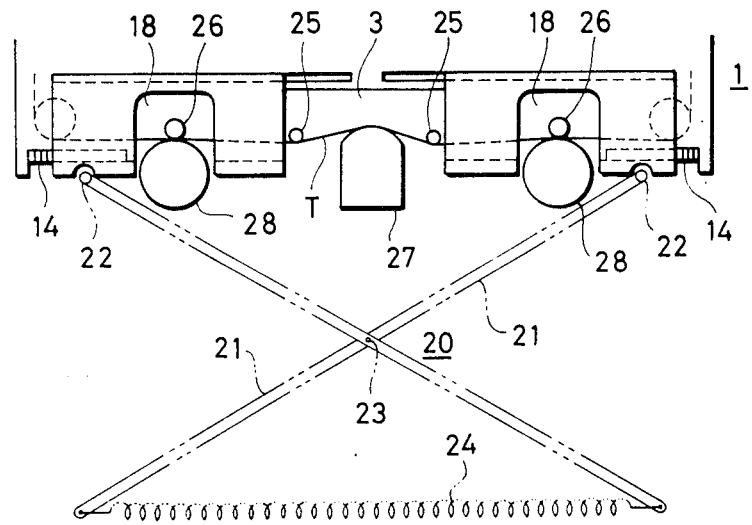
FIG. 4 is a plan view showing a state of the cassette in which the guard panels have been opened.

FIG. 4 shows the magnetic tape cassette in which the guard panels 4 have been opened.

When the guard panels 4 are moved respectively to the right and left by the opening device 20 to open the central opening 3 and the side openings 18 as shown in FIG. 4, first, head pins 25 and capstans 26 are allowed to pass into the openings from below the cassette to position behind the magnetic tape T, and thereafter a magnetic head 27 and pinch rollers 28 pass into the openings from in front of the cassette.

The recording and reproducing device should be so designed that the magnetic tape cassette 1 is unloaded from the device after the capstans 26 and the head pins 25 have been retracted from the cassette. Thus, while the magnetic tape cassette 1 is being unloaded from the cassette inserting section, the guard panels 4 are released from the opening device 20 to close completely the central opening 3 and the side openings 18 with the aid of the compression springs 14.

In the above-described embodiment, the length of each slide 8 is substantially equal to the length of the respective guard panel 4. However, the invention is not limited thereto or thereby. For instance, the length of the slide 8 may be reduced to half the length of the guard panel, or the slide 8 may be a plurality of spot-like protrusions arranged at certain intervals.

When the magnetic tape cassette 1 thus constructed is in storage (not loaded in the recording and reproducing device), the guard panels 4 close completely the central opening 3 and the side openings 18. Therefore, the guard panels 4 protect the magnetic tape T and prevent the entrance of dust into the cassette. Thus, the tape T is protected from damage and the recording and reproducing characteristics thereof are maintained unchanged.

The sides of the magnetic tape cassette 1 are symmetrical, and the guard panels 4 slide in the opposite directions to open the central openings 3 and the side openings 18. Therefore, both sides of the cassette 1 can be used, and the cassette is suitable for multi-track recording and reproducing operations using the fixed head system.

As the guard panels 4 can be opened with an opening device which is considerably simple in construction, the employment of this cassette will not make the recording and reproducing device intricate in construction.

In the above-described embodiment, the side openings 18 are formed by retracting both side portions of the front wall of the cassette body, similar to the case of the central opening. However, it should be noted that the invention is not limited thereto or thereby. For instance, the technical concept of the invention can be implemented as shown in FIGS. 5 and 6, with reference to which a second example of a magnetic tape cassette according to the invention will be described.

Figure 5:
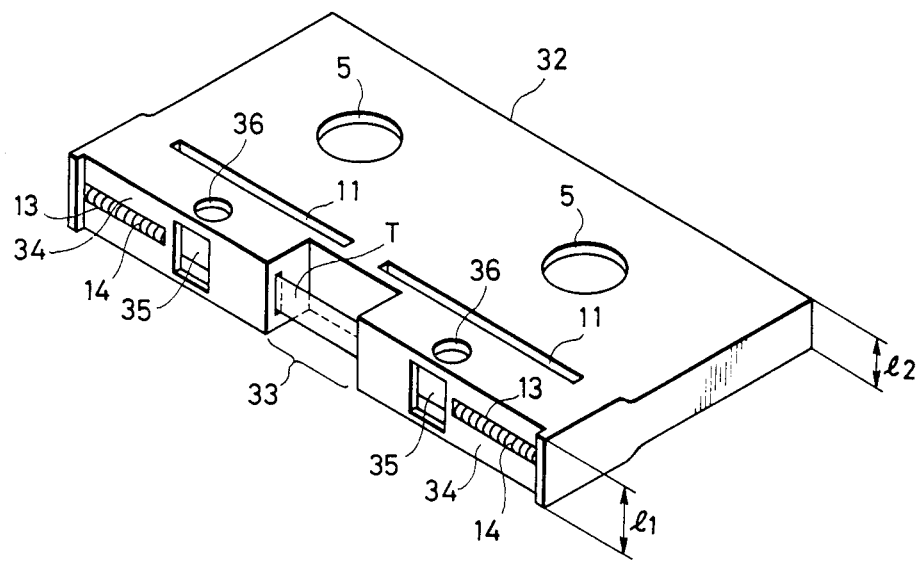
FIGS. 5 and 6 are perspective views showing a second example of a magnetic tape cassette according to the invention.

In FIG. 5, a central opening 33 is formed in the middle portion of the front wall of a cassette case body 32, as in the first described example, and rectangular openings 35 are also formed in the front wall on both sides of the central opening. First capstan holes 36 are formed in the upper and lower walls of the cassette case body slightly behind respective ones of the rectangular openings 35. The common central axis of the capstan holes 36 is perpendicular to the upper and lower wall of the cassette case body. The thickness $l_1$ (measured vertically) of the front part of the cassette case body 32 is larger than that $l_2$ of the rear part, as shown in FIG. 5. The central opening 33, the rectangular holes 35 and the capstan holes 36 are adapted to receive the magnetic head, the pinch rollers and the capstans, respectively.

In the cassette case body, slide grooves 11, compression springs 14 for biasing guard panels 40 (described later), structures for accommodating the compression springs 14, and other components are the same as those in the first example.

Figure 6:
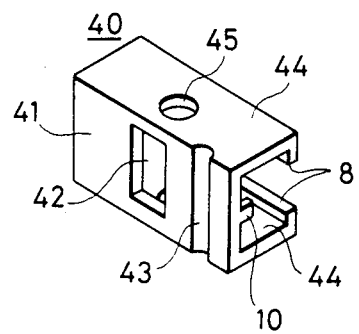

FIG. 6 shows one of the guard panels 40 coupled to the above-described cassette case body 32. As shown in FIG. 6, a front wall hole 42 corresponding to the aforementioed rectangular hole 35 is formed in the front wall 41 of the guard panel 40 substantially at the center of the front wall 41. Furthermore, an engaging groove 43 is formed in the front wall 41 extending vertically beside the front wall hole 42. Second capstan holes 45, corresponding to the above-described first capstan holes 36, are formed in the upper and lower walls 44 of the guard panel 40 substantially at the centers of the upper and lower walls 44. The common central axis of the holes 45 is perpendicular to the upper and lower walls 44. The guard panel 40 has the same slides 8 and protrusion 10 as in the first example described above.

The guard panels 40 coupled to the cassette case body 32 are slid in the longitudinal direction of the cassette case body by the above-described opening device 20 engaged with the engaging grooves 43. As a result, the central opening 33 is opened. At the same time, the front wall holes 42 align with the respective rectangular holes 35 to open them, while the second capstan holes 45 reach the respective first capstan hole 36 to open the latter.

Thus, the magnetic tape cassette thus constructed has the same effects as the first described magnetic tape cassette.

It has been described that the technical concept of the invention is applied to magnetic tape cassettes which are substantially equal in size to conventional compact cassettes. However, the invention is not limited thereto or thereby. That is, the technical concept of the invention is applicable to various other magnetic tape cassettes.

What is claimed:

1. In a magnetic tape cassette having a cassette case housing a pair of hubs on which a magnetic tape is wound, said case having upper and lower walls and a front wall therebetween, said front wall extending in a first direction between first and second ends, said front wall having a central opening therein for receiving a magnetic head and two side openings for receiving pinch rollers and capstans, with one of said side openings being located between said central opening and said first end, and the other of said side openings being located between said central opening and said second end, the improvement wherein said magnetic tape cassette includes:

slide grooves which are formed in said upper and lower walls of said cassette case behind said central opening and side openings and extending in said first direction;

two slidable guard panels which are substantially U-shaped in cross section, each of said guard panels having a front wall with a single through-hole formed therein, each of said guard panels further having slides engaged with said slide grooves, said two slidable guard panels being slidable towards each other for closing said central opening and said side openings and slidable away from each other for exposing said central opening and said side openings; and biasing means for urging said two guard panels toward each other.

2. The magnetic tape cassette of claim 1, wherein said biasing means comprises compression springs arranged on side portions of said front wall of said cassette case.

3. The magnetic tape cassette of claim 1, wherein each of said guard panels is provided with a recess for receiving an engaging part of an opening device for sliding said guard panels to open said central opening and said side openings.

4. The magnetic tape cassette of claim 1, wherein each of said through-holes which are formed in each of said front walls of said guard panels extends entirely across each of said front walls of said guard panels in a second direction which is tranverse to said first direction, and are contiguous with notches formed in upper and lower walls of said guard panels.

5. The magnetic tape cassette of claim 1, wherein said through-holes in said guard panels are surrounded by portions of said front walls of said guard panels.

6. The magnetic tape cassette of claim 5, wherein each of said guard panels has an engaging groove formed in its front wall, said groove extending perpendicular to a running direction of tape in said cassette.

7. The magnetic tape cassette of claim 2, wherein each of said guard panels includes a protrusion for engaging an end of a respective one of said compression springs.

8. The magnetic tape cassette of claim 1, wherein a width of each of said side openings in said first direction is substantially one-half of a width of said central opening in said first direction.

9. In a magnetic tape cassette having a cassette case housing a pair of hubs on which a magnetic tape is wound, said case having upper and lower walls and a front wall therebetween, said front wall extending in a first direction between first and second ends, said front wall having a central opening therein for receiving a magnetic head and two side openings for receiving pinch rollers and capstans, with one of said side openings being located between said central opening and said first end, and the other of said openings being located between said central opening and said second end, the improvement characterized in that:

said magnetic tape cassette includes slide grooves which are formed in said upper and lower walls of said cassette case behind said central opening and side openings and extending in said first direction;

said magnetic tape cassette further includes two slidable guard panels which are substantially U-shaped in cross section and sized to close said central and side openings, each of said guard panels having a front wall with a single through-hole formed therein, each of said guard panels futher having slides engaged with said slide grooves and being slidable for closing and exposing said central and side openings; and the distance in said first direction between said central opening and each of said side openings is less than the length of said central opening in said first direction.

10. The magnetic tape cassette of claim 9, further including biasing means for urging said two guard panels to close said central and side openings.

11. The magnetic tape cassette of claim 10, wherein said biasing means comprises compression springs arranged on side portions of said front wall of said cassette case.

12. The magnetic tape cassette of claim 10, wherein each of said guard panels is provided with a recess for receiving an engaging part of an opening device for sliding said guard panels to open said central opening and said side openings.

13. The magnetic tape cassette of claim 9, wherein each of said through-holes which are formed in said front walls of said guard panels extends entirely across each of said front walls of said guard panels in a second direction which is tranverse to said first direction, and are contiguous with notches formed in upper and lower walls of said guard panels.

14. The magnetic tape cassette of claim 10, wherein said through-holes in said guard panels are surrounded by portions of said front walls of said guard panels.

15. The magnetic tape cassette of claim 14, wherein each of said guard panels has an engaging groove formed in its front wall, said groove extending perpendicular to a running direction of tape in said cassette.

16. The magnetic tape cassette of claim 11, wherein each of said guard panels includes a protrusion for engaging an end of a respective one of said compression springs.

17. The magnetic tape cassette of claim 9, wherein a width of each of said side openings in said first direction is substantially one-half of a width of said central opening in said first direction.

* * * * *